W. H. MANNING.
VEHICLE BUFFER.
APPLICATION FILED APR. 13, 1920.

1,401,269.  Patented Dec. 27, 1921.

INVENTOR
W. H. MANNING
BY Milton B. Crandall
ATTORNEY

UNITED STATES PATENT OFFICE.

WILLIAM H. MANNING, OF SIOUX VALLEY TOWNSHIP, UNION COUNTY, IOWA.

VEHICLE-BUFFER.

1,401,269.  Specification of Letters Patent.  Patented Dec. 27, 1921.

Application filed April 13, 1920. Serial No. 373,649.

*To all whom it may concern:*

Be it known that I, WILLIAM H. MANNING, a citizen of the United States, and a resident of Sioux Valley township, in the county of Union and State of Iowa, have invented certain new and useful Improvements in Vehicle-Buffers, of which the following is a specification.

My invention has for its object the production of an improved fender or buffer for motor vehicles.

My invention has for a further object the production of a fender or buffer for a motor vehicle, simple and inexpensive in construction and embodying certain novel features and characteristics particularly adapting it for the protection of the rear end of such vehicles.

With these and other objects in view, the invention, consisting in the construction, combination and novel arrangement of parts will be fully understood from the following description, reference being had to the accompanying drawings which form a part of this application and in which like characters of reference indicate corresponding parts throughout the several views, of which,—

Figure 1:
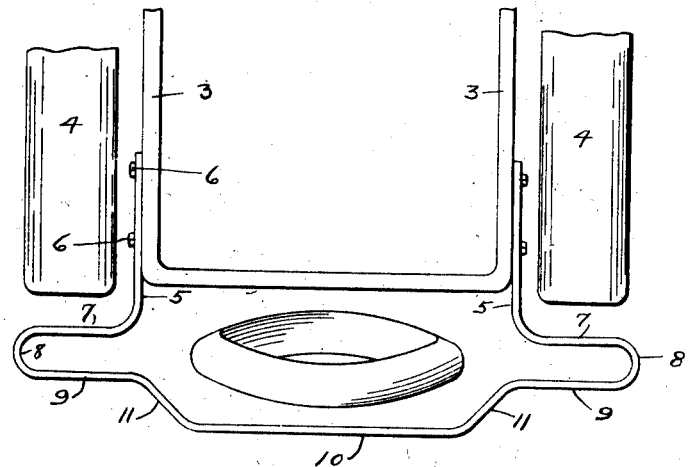
Figure 2:
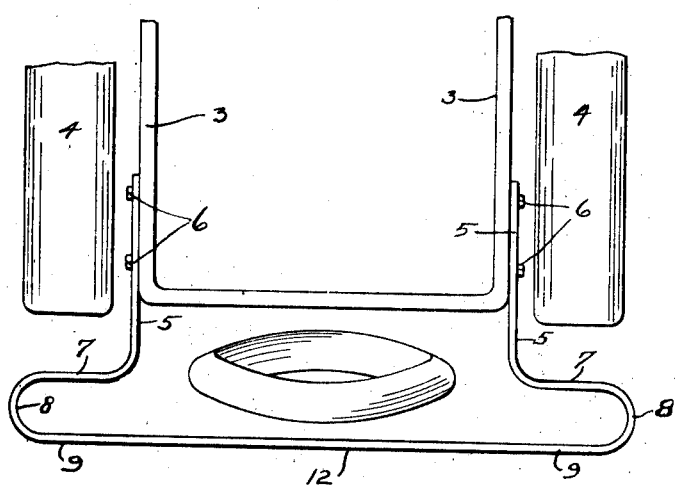

Figure 1 is a plan of the preferred form of the invention as applied to a vehicle, and Fig. 2 is a similar view of a modification applied to the vehicle.

Referring now to the illustrations, 3, represents the main frame of a motor vehicle chassis and, 4, the usual wheel fenders or mud guards at the sides thereof. My device consists essentially of a spring bar having forwardly extending end portions, 5, which are adapted to embrace the outer sides of the frame member, 3, and be secured thereto by lag-bolts, 6, or otherwise. Adjacent the portions 5, the bar is formed with oppositely disposed laterally extending loops, the sides 7 and 9 of which are disposed in parallelism and are so formed through a reverse bend at 8, that the sides are in spaced relation to each other. The loops are so disposed that each side of each loop is in substantially the same plane as the corresponding side of the other loop.

In the structure illustrated in Fig. 2, the intermediate portion, 12, of the bar is transversely disposed and is positioned in the same plane as the loop sides, 9. The device is so constructed that the portion, 12, is positioned a distance well in the rear of the main-frame to accommodate the usual spare tire between the main-frame and part, 12; and the loops are extended beyond the planes of the outer edges of the fenders, 4.

The preferred embodiment illustrated in Fig. 1, only differs from the structure above set forth in that the intermediate portion, 10, of the bar is disposed in the rear of the plane of the loop sides, 9, the end portions, 11, of the intermediate portion being bent at an angle forwardly to join the loop sides, 9. The preferred form has the advantage that it affords sufficient space for two or more spare tires and yet the rear sides of the loops extend no farther rearwardly than in the first form, and furthermore, the preferred construction is capable of absorbing more impact shock than the previously-described form, for example, the concussion of a blow delivered on the intermediate portion of the bar presented in Fig. 2 has comparatively little effect on the sides, 7, on the loop. While in the preferred form, a blow similarly delivered upon the bar would be partially absorbed by the portion, 10, and through the medium of the forwardly extending parts, 11, a considerable portion of the shock would be imparted to both sides of the loops.

Having thus described my invention what I claim as new and desire to secure by Letters Patent of the United States is,—

A rear fender for a vehicle including its main-frame and wheel-fenders at the sides thereof, consisting of a bar of spring material formed with its end portions extended forwardly and adapted to be secured to the sides of the frame, the portions of the bar adjacent the said end portions being formed with laterally-extending U-shaped loops having parallel arms, and extended in the rear of and to the line of the outer wheel fender edges, and the portions of the bar adjacent the said loops being bent rearwardly coincident with the planes of the forwardly-extended end portions, to space the intermediate portion of the bar a distance in the rear of the plane of the rear arms of the loops.

In testimony whereof I have hereunto set my hand this 9th day of April, 1920.

WILLIAM H. MANNING.